United States Patent
Hsu et al.

(10) Patent No.: US 7,487,403 B2
(45) Date of Patent: Feb. 3, 2009

(54) METHOD FOR HANDLING A DEVICE FAILURE

(75) Inventors: Yu-Cheng Hsu, Tucson, AZ (US); John Norbert McCauley, Tucson, AZ (US); William Griswold Sherman, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/987,572

(22) Filed: Nov. 12, 2004

(65) Prior Publication Data

US 2006/0117227 A1 Jun. 1, 2006

(51) Int. Cl.
*G06F 11/00* (2006.01)

(52) U.S. Cl. .................................................... 714/44
(58) Field of Classification Search .............. 714/44, 714/43, 10, 11, 38; 710/38
See application file for complete search history.

(56) References Cited

U.S. PATENT DOCUMENTS

| | | | |
|---|---|---|---|
| 5,245,368 A | | 9/1993 | Farrell et al. |
| 5,377,109 A | | 12/1994 | Baker et al. |
| 5,408,646 A | * | 4/1995 | Olnowich et al. ............... 714/4 |
| 5,488,716 A | | 1/1996 | Scheider et al. |
| 5,671,441 A | * | 9/1997 | Glassen et al. ................ 710/8 |
| 5,754,526 A | * | 5/1998 | Kaneko et al. .............. 370/217 |
| 5,963,540 A | | 10/1999 | Bhaskaran |
| 6,101,508 A | | 8/2000 | Wolff |
| 6,247,023 B1 | | 6/2001 | Hsiao et al. |
| 6,601,128 B1 | * | 7/2003 | Burton et al. ................ 710/316 |
| 6,636,982 B1 | | 10/2003 | Rowlands |
| 6,725,295 B2 | * | 4/2004 | Iwatani ........................ 710/38 |
| 6,725,397 B1 | | 4/2004 | Emberty et al. |
| 6,728,905 B1 | | 4/2004 | Gnanasivam et al. |
| 6,732,166 B1 | | 5/2004 | Woodruff |
| 6,738,818 B1 | | 5/2004 | Shah |
| 6,886,053 B2 | * | 4/2005 | Paul ............................. 710/38 |
| 6,968,401 B2 | * | 11/2005 | McBrearty et al. ............ 710/38 |

(Continued)

FOREIGN PATENT DOCUMENTS

JP    58128099 A    7/1983

(Continued)

OTHER PUBLICATIONS

US Patent Application, filed Nov. 12, 2004, entitled "Configuring Shared Devices Over a Fabric", invented by T. R. Block, Y. Hsu, J. N. McCauley, S. P. Riley, W. G. Sherman, & C. Song.

*Primary Examiner*—Robert Beausoliel
*Assistant Examiner*—Amine Riad
(74) *Attorney, Agent, or Firm*—David W. Victor; Konrad Raynes & Victor LLP

(57) ABSTRACT

Provided is a method for handling a fabric failure. A module intercepts a signal indicating a failure of a path in a fabric providing a connection to a shared device. The module generates an interrupt to a device driver in an operating system providing an interface to the shared device that is inaccessible due to the path failure. The device driver requests information from the module on a status of a plurality of devices that are not accessible due to the path failure and receives information indicating the inaccessible device. The device driver reconfigures to discontinue use of the inaccessible device.

14 Claims, 4 Drawing Sheets

U.S. PATENT DOCUMENTS

| | | | |
|---|---|---|---|
| 7,007,189 B2* | 2/2006 | Lee et al. | 714/4 |
| 7,134,040 B2* | 11/2006 | Ayres | 714/4 |
| 7,134,052 B2* | 11/2006 | Bailey et al. | 714/44 |
| 7,152,178 B1* | 12/2006 | Vook et al. | 714/4 |
| 2002/0029358 A1* | 3/2002 | Pawlowski et al. | 714/39 |
| 2003/0061377 A1* | 3/2003 | Gregg et al. | 709/238 |
| 2003/0061475 A1 | 3/2003 | Gregg et al. | |
| 2004/0033141 A1 | 2/2004 | Stillhard et al. | |
| 2004/0208118 A1* | 10/2004 | DeBoer et al. | 370/223 |
| 2006/0059287 A1* | 3/2006 | Rivard et al. | 710/300 |

FOREIGN PATENT DOCUMENTS

| | | |
|---|---|---|
| JP | 1053237 A | 3/1989 |
| JP | 3090936 A | 4/1991 |

\* cited by examiner

METHOD FOR HANDLING A DEVICE FAILURE

BACKGROUND OF THE INVENTION

1. Field of the Invention

The present invention relates to a method, system, and program for handling a fabric failure.

2. Description of the Related Art

In certain computing environments, multiple host systems may communicate with a control unit, such as an IBM Enterprise Storage Server (ESS)®, for data in a storage device managed by the ESS receiving the request, providing access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may include duplicate and redundant processing complexes, also known as clusters, to allow for failover to a surviving cluster in case one fails. The clusters may access shared devices.

SUMMARY

Provided are a method, system, and program for handling a fabric failure. A module intercepts a signal indicating a failure of a path in a fabric providing a connection to a shared device. The module generates an interrupt to a device driver in an operating system providing an interface to the shared device that is inaccessible due to the path failure. The device driver requests information from the module on a status of a plurality of devices that are not accessible due to the path failure and receives information indicating the inaccessible device. The device driver reconfigures to discontinue use of the inaccessible device.

DETAILED DESCRIPTION

Figure 1:
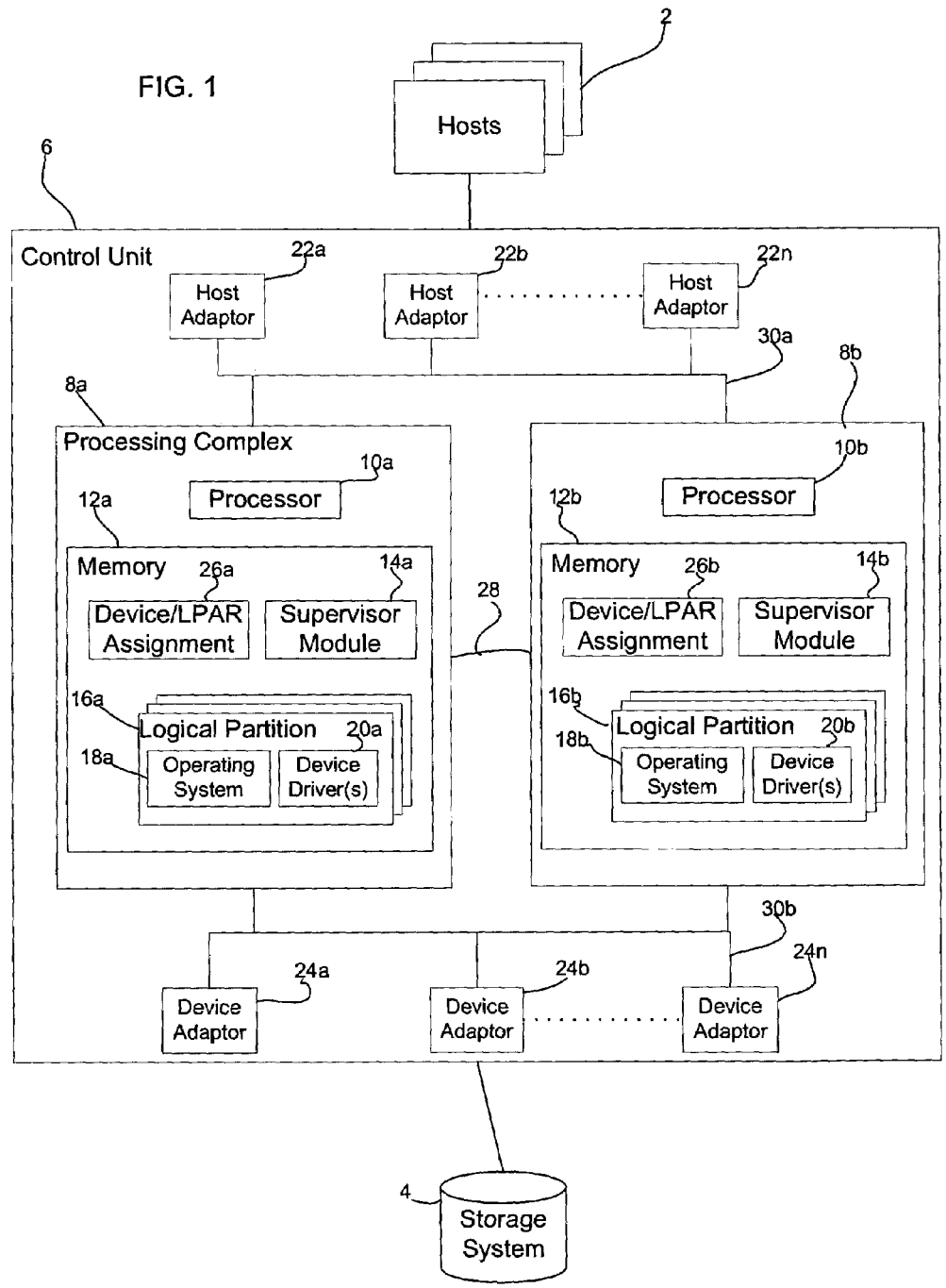
FIG. 1 illustrates a computing environment in which embodiments are implemented.

FIG. 1 illustrates a computing environment in which aspects of the invention are implemented. One or more hosts 2 communicate Input/Output (I/O) requests directed to a storage system 4 to a control unit 6, where the control unit 6 manages access to the storage system 4. In one embodiment, the control unit 6 is comprised of two processing complexes 8a, 8b, each including a processor 10a, 10b and a memory 12 12a. Each processing complex 8a, 8b includes a supervisor module 14a, 14b. The supervisor modules 14a, 14b comprise code that manage and coordinate the operations of one or more logical partitions 16a, 16b executing in the processing complexes 8a, 8b. Each logical partition 16a, 16b separately executes an operating system 18a, 18b and device drivers 20a, 20b. The logical partitions comprise a division of the processors 10a, 10b into logical independent processing systems each having their own operating systems 18a, 18b and device drivers 20a, 20b. Multiple logical partitions may execute in each processing complex, managed by the supervisor module for that complex.

Each device driver 20a, 20b provides an interface between the operating system 18a, 18b, in the logical partition 16a, 16b in which the device driver 20a, 20b executes, and an external device, such as host adaptors 22a, 22b . . . 22n and device adaptors 24a, 24b . . . 24n. The host adaptors 22a, 22b . . . 22n enable the processing complexes 8a, 8b to communicate with the hosts 2 and the device adaptors 24a, 24b . . . 24n enable the processing complexes 8a, 8b to communicate with the storage system 4. Thus, the processing complexes 8a, 8b share devices, such as adaptors 22a, 22b . . . 22n, 24a, 24b . . . 24n. The variable "n" is used to denote an integer instance of an element, and may indicate different or the same integer value when used with different elements. For instance, 22n and 24n may indicate a same or different number of host adaptors 22n and device adaptors 24n.

The processing complexes 8a, 8b communicate with the host adaptors 22a, 22b . . . 22n over a fabric 30a and the device adaptors 24a, 24b . . . 24n over a fabric 30b. The fabrics 30a, 30b may comprise one or more interfaces providing communication paths between the processing complexes 8a, 8b and adaptors. A path comprises the hardware in the fabrics 30a, 30b that enables communication with shared adaptors over the fabric. In one embodiment, the fabric may comprise a Fibre Channel arbitrated loop configuration, a serial loop architecture or a bus interface, such as a Peripheral Component Interconnect (PCI) interface. Each processing complex 8a, 8b may be assigned a portion of the adaptors 22a, 22b . . . 22n, 24a, 24b . . . 24n and during initialization, the processing complexes 8a, 8b are responsible for initializing portions of the fabrics 30a, 30b providing communication paths to the adaptors that are assigned to that processing complex. For instance, if processing complex 8a is assigned adaptors 22a, 22b, 24a, 24b, then processing complex 8a would initialize and configure that portion of the fabric 30a, 30b providing communication paths between processing complex 8a and adaptors 22a, 22b, 24a, 24b. Likewise, if processing complex 8b is assigned adaptors 22n and 24n, then processing complex 8b would initialize and configure that portion of the fabric 30a, 30b and paths enabling communication between processing complex 8b and adaptors 22n and 24n. Configuring the fabrics 30a, 30b comprises setting registers in fabric hardware, e.g., the Fibre Channel loop hardware, serial loop architecture hardware or bus interface hardware, and performing other initialization and discovery related operations.

The supervisor modules 14a, 14b maintain device/logical partition (LPAR) assignments 26a, 26b identifying an assignment of the adaptors 22a, 22b . . . 22n, 24a, 24b . . . 24n to a logical partition 16a, 16b in each processing complex 8a, 8b, such that communication between a specific adaptor 22a, 22b . . . 22n, 24a, 24b . . . 24n and the processing complex 8a, 8b is handled by the device driver 20a, 20b executing in the logical partition 16a, 16b assigned to the specific adaptor 22a, 22b . . . 22n, 24a, 24b . . . 24n.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b . . . 24n, over a device network (not shown), which may comprise a local area network (LAN), storage area network (SAN), bus interface, serial interface, etc. Further, the processing complexes 8a, 8b communicate over a connection 28 enabling processor inter-communication to manage configuring operations performed with respect to the shared devices, such as the shared adaptors 22a, 22b . . . 22n, 24a, 24b . . . 24n. In alternative embodiments, there may be only one fabric connecting all adaptors 22a, 22b . . . 24n, 24a, 24b . . . 24n, i.e., fabrics 30a and 30b are part of a single interconnected fabric, two fabrics, such as shown 30a and 30*b*, or more than two fabrics. The host 22*a*, 22*b* . . . 2*n* and device 24*a*, 24*b* . . . 24*n* adaptors may connect via separate adaptors, such as 30*a* and 30*b* shown in FIG. 1, or connect on a same fabric.

The control unit 6 may comprise any type of server, such as an enterprise storage server, storage controller, etc., or other device used to manage I/O requests to attached storage system (s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6, via the adaptors 22*a*, 22*b* . . . 22*n*, over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface.

A failure in the fabric 30*a*, 30*b* could generate machine check conditions to the operating systems 18*a*, 18*b* in the processing complexes 8*a*, 8*b* which could cause both processing complexes to crash if the shared fabric 30*a*, 30*b* hardware has a type of fatal error. Described embodiments provide techniques to fence off a inaccessible shared devices due to failure in the fabric paths to these shared devices to avoid the situation where the inaccessibility of the shared devices could cause both processing complexes 8*a*, 8*b* to crash.

Figure 2:
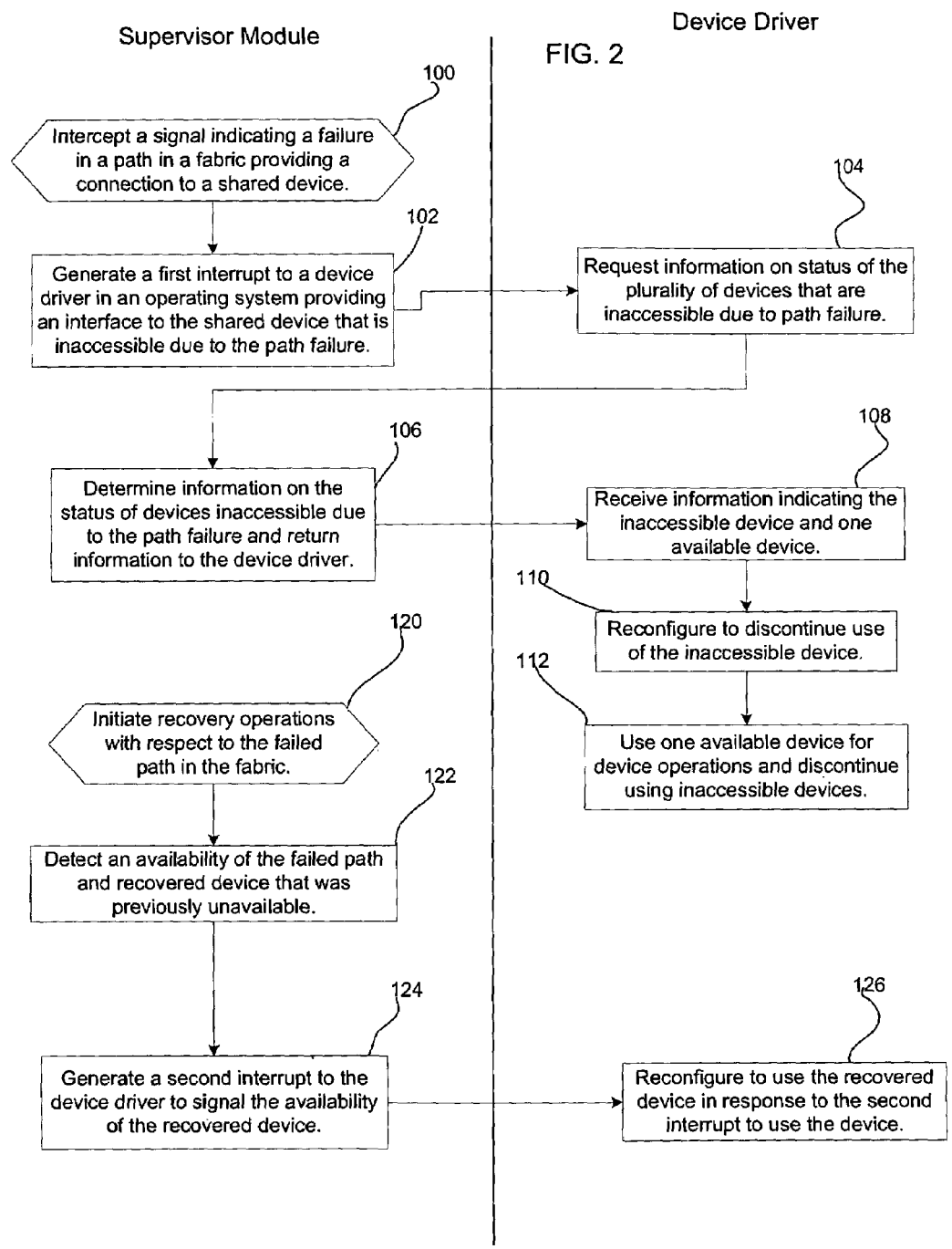
FIGS. 2, 3, and 4 illustrate operations to handle a device failure.

FIG. 2 illustrates an embodiment of operations performed by the supervisor module 14*a*, 14*b* and device driver 20*a*, 20*b* to handle a failure at one device, such as one of the host adaptors 22*a*, 22*b* . . . 22*n* or device adaptors 24*a*, 24*b* . . . 24*n*. The operations of FIG. 2 are described with respect to a single processing complex 8*a* having a supervisor module 14*a*, an operating system 18*a*, and device drivers 20*a*. However, the operations may apply to a processing complex 8*a* having multiple logical partitions 16*a* or a dual processing complex system such as shown in FIG. 1, where either of the processing complexes 8*a*, 8*b* include code to perform the operations of FIG. 1. A supervisor module 14*a* intercepts (at block 100) a signal indicating a failure in a path in the fabric 30*a*, 30*b* to a shared device, e.g., 22*a*, 22*b* . . . 22*n*, 24*a*, 24*b* . . . 24*n*. The supervisor module 14*a*, 14*b* generates (at block 102) a first interrupt to a device driver 20*a* for an operating system 18*a* providing an interface to the shared device that is inaccessible due to the path failure.

In response, the device driver 20*a* requests (at block 104) information on a status of the plurality of devices that are inaccessible due to path failure in the fabric 30*a*, 30*b*. In one embodiment, the device driver 20*a* for the inaccessible device may submit multiple requests to the supervisor module 14*a*, one request for each adaptor that the device driver 20*a* manages. The supervisor module 14*a*, in response to the device driver 20*a* request, determines (at block 106) information on the status of devices inaccessible due to the path failure and returns this information to the requesting device driver 20*a*.

The device driver 20*a* receives (at block 108) the information indicating the inaccessible device and one available device and reconfigures (at block 110) to discontinue use of the inaccessible device and failed paths. The device driver 20*a* may select (at block 112) one available device to use for device operations. In this way, the device driver 20*a* may fence off the inaccessible device and reconfigure paths to use available paths to one of the available shared devices to use for device operations, such as one of the available adaptors 22*a*, 22*b* . . . 22*n*, 24*a*, 24*b* . . . 24*n*.

The supervisor module 14*a* may initiate (at block 120) recovery operations with respect to the failed path in the fabric 30*a*, 30*b*. The supervisor module 14*a* may query the devices to detect (at block 122) an availability of the failed path and recovered device that was previously inaccessible due to the path failure. If one device has been recovered, then the supervisor module 14*a* generates (at block 124) a second interrupt to the device driver 14*a* assigned to the recovered device to signal the availability of the recovered device. In response to this second interrupt, the device driver 20*a* reconfigures (at block 126) the paths to again use the recovered device.

Figure 3:
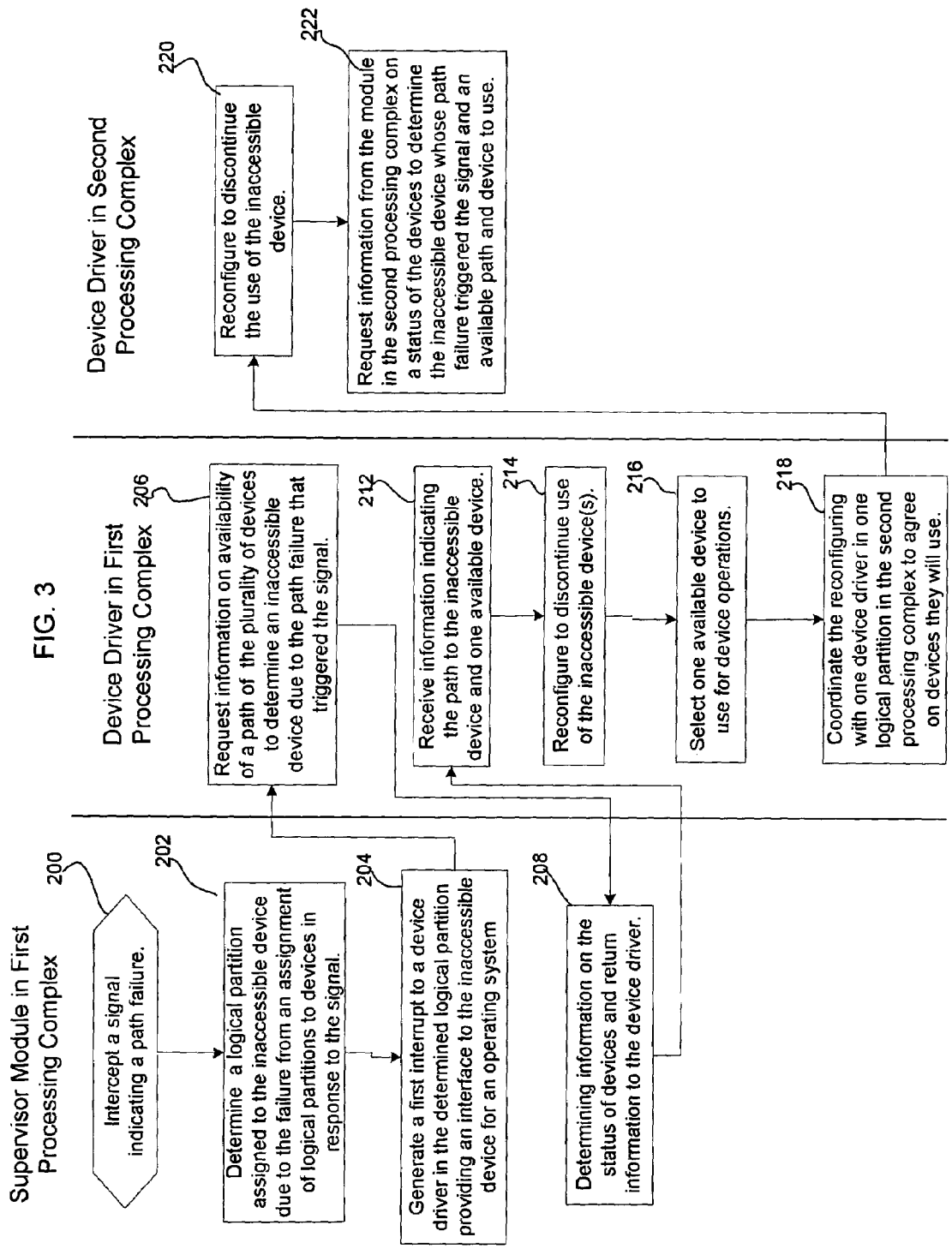

FIG. 3 illustrates an embodiment for managing an inaccessible device in dual processing complex system 8*a*, 8*b*, such as shown in FIG. 1. The fabric 30*a*, 30*b* may be configured to send the signal indicating a path failure to one processing complex, e.g., 8*a*. Although operations are described with respect to processing complex 8*a* receiving the failure check condition, the same described operations of FIG. 3 could be performed by processing complex 8*b* upon receiving the failure check condition, where the roles of the processing complexes are reversed. The supervisor module 14*a* intercepts (at block 200) the signal indicating a path failure in the fabric and determines (at block 202) a logical partition 16*a* assigned to the inaccessible device from an assignment of logical partitions to devices, e.g., the device/LPAR assignment 26*a*, in response to the signal. The supervisor module 14*a* generates (at block 204) a first interrupt to the device driver 20*a* in the determined logical partition 16*a* providing an interface to the inaccessible device for the operating system 18*a*.

In response to the interrupt, the device driver 20*a* requests (at block 206) information on a status on the plurality of devices 22*a*, 22*b* . . . 22*n*, 24*a*, 24*b* . . . 24*n* to determine the inaccessible device due to the path failure that triggered the signal. In response to the information request, the supervisor module 14*a* determines (at block 208) information on the status of devices and returns the information to the requesting device driver 20*a*. The device driver 20*a* receives (at block 212) information indicating the inaccessible device and at least one available device. The device driver 20*a* reconfigures (at block 214) the paths to discontinue use of the inaccessible device(s) and selects (at block 216) one available device over an available path to configure for use for device operations.

As part of the reconfiguring, the device driver 20*a*, directly or indirectly through the supervisor module 14*a*, coordinates (at block 218) the reconfiguring with one device driver 20*b* in one logical partition 16*b*, in the second processing complex 8*b*. In one embodiment, the device driver may transmit a signal indicating that the path failed or device is inaccessible to the supervisor module 14*b* in the other processing complex 8*b* to cause the supervisor module to send the interrupt to the device driver 20*b* in one logical partition 16*b* to initiate the reconfiguration and recovery operations. Alternatively, the device driver 20*a* may communicate directly with the device driver 20*b* in the other processing complex 14*b*. In response, the device driver 14*b* in the second processing complex 8*b* reconfigures (at block 220) the paths to discontinue the use of the inaccessible device. The device driver 20*b* may request (at block 222) information from the supervisor module 14*b* in the second processing complex 8*b* on a status of the devices to determine the inaccessible device whose path failure triggered the signal and an available path and device to use.

Figure 4:
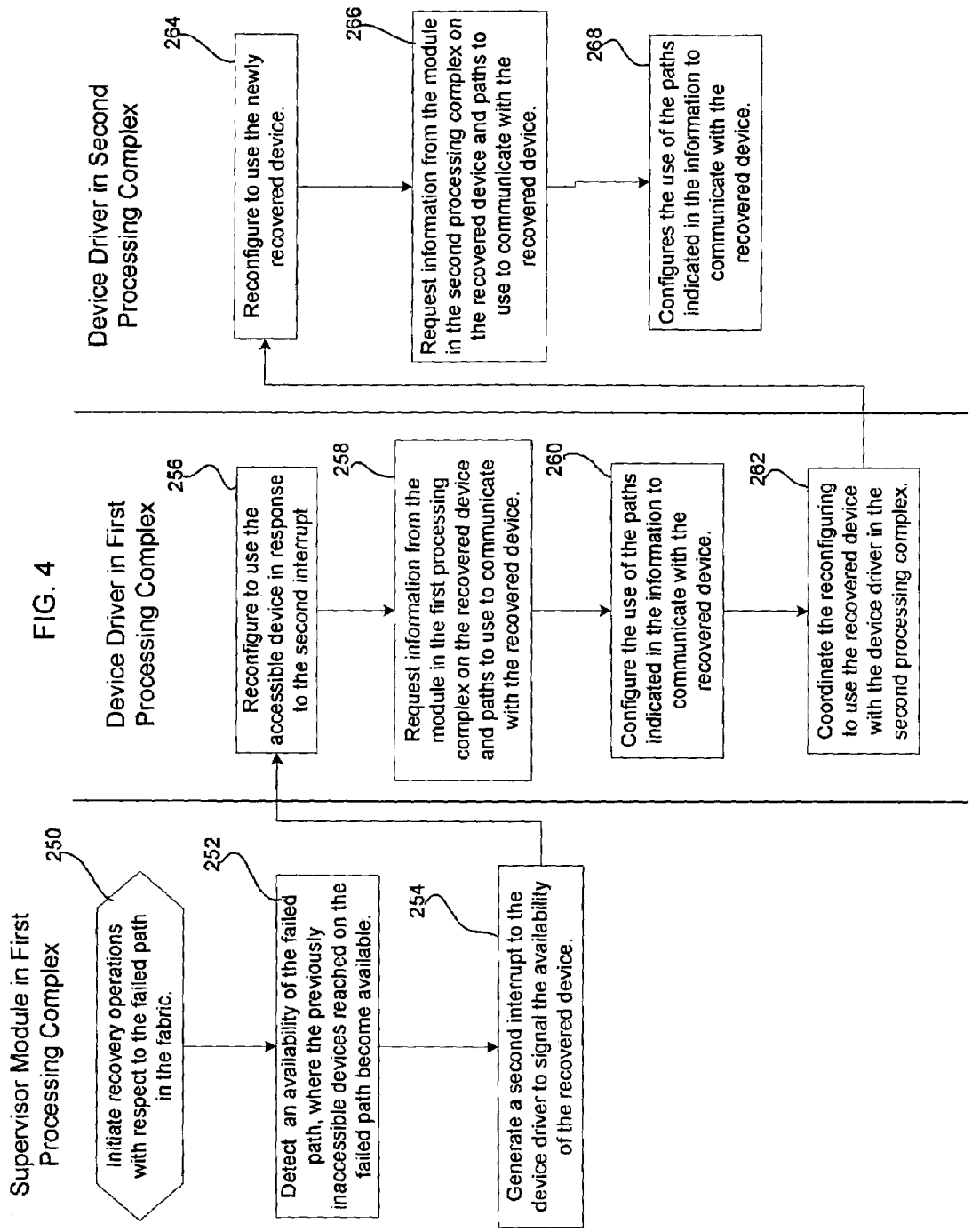

FIG. 4 illustrates operations performed by the dual processing complex 8*a*, 8*b* system of FIG. 1 to handle a recovery of a failed path in the fabric 30*a*, 30*b*. The supervisor module 14*a* may initiate (at block 250) recovery operations with respect to the failed path in the fabric 30*a*, 30*b* and detect (at block 252) an availability of the failed path, where the previously inaccessible devices reached on the failed path become available due to the path recovery. If so, the supervisor module 14a generates (at block 254) a second interrupt to the device driver 20a assigned to the recovered device to signal the availability of the recovered device. The device driver 20a reconfigures (at block 256) to use the recovered device in response to the second interrupt. As part of reconfiguring, the device driver 20a may request (at block 258) information from the supervisor module 14a in the first processing complex 8a on the recovered device and paths to use to communicate with the recovered device. The device driver 20a configures (at block 260) the use of the paths indicated in the information to communicate with the recovered device.

As part of the reconfiguring, the device driver 20a in the first processing complex 8a may coordinate (at block 262) the reconfiguring to use the recovered device with the device driver 20b in the second processing complex 8b. The device driver 20a may communicate directly with the device driver 20b to coordinate the reconfiguring or communication through the supervisor module 14b. The device driver 20b then reconfigures (at block 264) to use the recovered device. The device driver 20b, as part of the reconfiguring, may request (at block 266) information from the supervisor module 14b in the second processing complex 8b on the recovered device and paths to use to communicate with the recovered device. The device driver 20b then configures (at block 268) the use of the paths indicated in the information to communicate with the recovered device. As part of the recovery operations, the device driver 20b may signal completion of the reconfiguring with the device driver 20a in the other processing complex.

With the operations of FIGS. 3 and 4, the first and second processing complexes 8a, 8b coordinate with one another to fence off a failed path and inaccessible devices, such as adaptors 22a, 22b ... 22n, 24a, 24b ... 24n to avoid using and then reconfigure failed paths that have become available.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In embodiments where the processing complexes have multiple logical partitions, the supervisor manages the execution of different logical partitions. In embodiments, where the processing complex does not have logical partitions, the supervisor module may comprise an intermediate device driver.

In the described embodiments, the control unit 6 included two processing complexes 8a, 8b. In additional embodiments, there may be more than two systems accessing a shared device. In such embodiments, the device driver 20a receiving the interrupt may communicate with multiple processing complexes to coordinate the fencing off of the failed path and inaccessible device and the reconfiguration to use the inaccessible device once the failed path recovers.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 2-4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
intercepting, with a module, a signal indicating a failure of a path in a fabric providing a connection to a shared device;
generating, with the module, an interrupt to a device driver in an operating system providing an interface to the shared device that is inaccessible due to the path failure;
requesting, with the device driver, information from the module on a status of a plurality of devices that are not accessible due to the path failure;
receiving, by the device driver, information indicating the inaccessible device;
reconfiguring, by the device driver, to discontinue use of the inaccessible device;
managing, by the module, operations of multiple logical partitions each executing a separate operating system and device driver interfacing to the devices; and
determining, by the module, a logical partition assigned to the inaccessible device from an assignment of logical partitions to devices in response to the signal, wherein the interrupt is sent to the device driver in the determined logical partition.

2. The method of claim 1, wherein a plurality of paths in the fabric are configured to the devices, including the inaccessible device, wherein the information from the module indicates one available device, and wherein reconfiguring further comprises:

selecting one of the paths in the fabric to one available device to use for device operations.

3. The method of claim 1, wherein requesting the information further comprises:

requesting information on all of the devices.

4. The method of claim 1, wherein the interrupt comprises a first interrupt, further comprising:

performing, by the module, recovery operations with respect to the failed path;

detecting, by the module, an availability of the failed path in response to the recovery operations, wherein the inaccessible device comprises a recovered device in response to detecting the availability of the failed path; and generating, by the module, a second interrupt to the device driver to signal the availability of the recovered device.

5. The method of claim 4, further comprising:

reconfiguring, by the device driver, to use the recovered device in response to the second interrupt.

6. The method of claim 1, wherein the module and logical partitions are included in a first processing complex, wherein a second processing complex includes a module and logical partitions, wherein the reconfiguring by the device driver in one logical partition in the first processing complex further comprises coordinating the reconfiguring with the second processing complex.

7. The method of claim 6, further comprising:

reconfiguring, by the device driver in the second processing complex, to discontinue the use of the inaccessible device in response to the coordinating by the device driver in the determined logical partition in the first processing system.

8. The method of claim 7, further comprising:

requesting, by the device driver in the second processing system, information from the module in the second processing complex on a status of the devices to determine the inaccessible device due to the path failure that triggered the signal.

9. The method of claim 8, wherein the interrupt comprises a first interrupt, further comprising:

performing, by the module in the first processing complex, recovery operations with respect to the failed path in the fabric;

detecting, by the module in the first processing complex, an availability of the failed path in response to the recovery operations, wherein the inaccessible device comprises a recovered device in response to detecting the path availability;

generating, by the module in the first processing complex, a second interrupt to the device driver to signal the availability of the recovered device; and reconfiguring, by the device driver in the first processing complex, to use the recovered device in response to the second interrupt.

10. The method of claim 9, wherein reconfiguring by the device driver in the first processing complex to use the recovered device further comprises:

requesting information from the module in the first processing complex on the recovered device and paths to use to communicate with the recovered device, wherein the reconfiguring configures the use of the paths indicated in the information to communicate with the recovered device.

11. The method of claim 9, further comprising:

coordinating, by the device driver in the first processing complex, the reconfiguring to use the recovered device with the device driver in the second processing complex; and reconfiguring, by the device driver in the second processing complex, to use the recovered device.

12. A method for deploying computing instructions, comprising integrating computer-readable code into a first and second processing complexes, wherein the code in combination with the first and second processing complexes is enabled to cause the first and second processing complexes to perform:

intercepting, with a module, a signal indicating a failure of a path in a fabric providing a connection to a shared device;

generating, with the module, an interrupt to a device driver in an operating system providing an interface to the shared device that is inaccessible due to the path failure;

requesting, with the device driver, information from the module on a status of a plurality of devices that are not accessible due to the path failure;

receiving, by the device driver, information indicating the inaccessible device;

reconfiguring, by the device driver, to discontinue use of the inaccessible device;

managing, by the module, operations of multiple logical partitions each executing a separate operating system and device driver interfacing to the devices; and determining, by the module, a logical partition assigned to the inaccessible device from an assignment of logical partitions to devices in response to the signal, wherein the interrupt is sent to the device driver in the determined logical partition.

13. The method of claim 12, wherein a plurality of paths in the fabric are configured to the devices, including the inaccessible device, wherein the information from the module indicates one available device, and wherein reconfiguring further comprises:

selecting one of the paths in the fabric to one available device to use for device operations.

14. The method of claim 12, wherein the interrupt comprises a first interrupt, further comprising:

performing, by the module, recovery operations with respect to the failed path;

detecting, by the module, an availability of the failed path in response to the recovery operations, wherein the inaccessible device comprises a recovered device in response to detecting the availability of the failed path; and generating, by the module, a second interrupt to the device driver to signal the availability of the recovered device.

* * * * *